April 13, 1954 N. D. NEWBY 2,675,427

ELECTROSTATIC SCANNING MECHANISM FOR SCANNING BOTH TIPS AND RINGS OF CALLING LINES AND COMBINING THE RESULTS OF THESE SCANNING OPERATIONS

Filed Dec. 21, 1951 2 Sheets-Sheet 1

INVENTOR
N. D. NEWBY
BY William F. Simpson
ATTORNEY

ELECTROSTATIC SCANNING MECHANISM FOR SCANNING BOTH TIPS AND RINGS OF CALLING LINES AND COMBINING THE RESULTS OF THESE SCANNING OPERATIONS

Filed Dec. 21, 1951 2 Sheets-Sheet 2

INVENTOR
N. D. NEWBY
BY
William F. Simpson
ATTORNEY

Patented Apr. 13, 1954 2,675,427

UNITED STATES PATENT OFFICE 2,675,427

ELECTROSTATIC SCANNING MECHANISM FOR SCANNING BOTH TIPS AND RINGS OF CALLING LINES AND COMBINING THE RESULTS OF THESE SCANNING OPERATIONS

Neal D. Newby, Leonia, N. J., assignor to Bell Telephone Laboratories, Incorporated, New York, N. Y., a corporation of New York Application December 21, 1951, Serial No. 262,842

25 Claims. (Cl. 179—18)

This invention relates to improvements in electrostatic scanning and distributing mechanisms, circuits and methods and more particularly relates to an improvement in the electrostatic scanning arrangement of the type disclosed in my copending application Serial No. 185,929, filed September 21, 1950.

In the scanning arrangement disclosed in said copending application provision was made for scanning or sampling the potential condition of one side of a plurality of lines or calling circuits at repeated intervals. Such an arrangement has certain shortcomings in case of trouble conditions which it is incapable of recognizing. For example, if the grounded side of the line is employed for scanning purposes then an accidental ground on the other side of the line renders the line inoperative but no indication is received at the central office to indicate that any trouble exists upon the line. Likewise, should the battery side of the line be scanned then no indication is given should leaks or faults or opens in the other side of the line be encountered.

In accordance with the present invention certain of these difficulties are overcome by means for scanning the potential condition of both sides of a calling or subscriber's line, a trunk circuit, or other calling or signaling line or circuit and then combining the scanned output of both sides of the line. Under these circumstances a greater output is obtained and at the same time it is much easier to recognize trouble conditions on the line and give an alarm or other indication at the central office to the maintenance forces so that the trouble condition may be removed at the earliest possible moment and with the least amount of effort and with the shortest interruption of service.

While it is possible to provide two scanning devices such as disclosed in the above-identified copending application such devices are complicated and expensive and where two are provided it will be necessary to maintain the two scanning mechanisms in synchronism so that the outputs may be combined or otherwise compared and utilized for signaling purposes.

In accordance with the present invention the above-described difficulties are largely eliminated by applicant's present scanning mechanism in which each side of the line is scanned, one after the other in rapid succession by the same scanning apparatus and then the outputs from these two scanning operations combined to give any desired output indication.

In accordance with one specific exemplary embodiment of the present invention the scanning or distributor devices have two adjacent segments connected to opposite sides of called lines and the two line segments are separated from corresponding pairs of segments of other lines by a shielding segment. The output from the scanning arm which sweeps adjacent the various segments is combined so that the resulting signal is a function of the voltage of each of the line conductors of the respective lines.

The improved arrangement in accordance with this invention has a further advantage that a large voltage difference usually exists between various line segments so that a better output wave form is obtained at all times from the scanning or distributing mechanisms.

In accordance with one specific embodiment of the present invention the magnitude of a pulse of one polarity, obtained as a result of scanning one side or conductor of a calling line or trunk, is added to the magnitude of a succeeding pulse of the opposite polarity obtained as a result of scanning the other side or conductor of the same calling line or trunk and an output pulse is obtained having a magnitude which is a function of the sum of the magnitudes of said pulses of opposite polarity.

Another feature of this invention relates to circuits, apparatus and methods of distinguishing between the sum of pulses of different magnitudes.

Another feature of this invention relates to circuits, apparatus and methods for obtaining a signaling condition which is a function of the sum of the signaling conditions on both line conductors of a signaling, transmission, or communication line.

Another feature of this invention relates to circuits, apparatus and methods of restoring the summing circuit to a predetermined condition between the scanning of each pair of segments assigned to the various calling lines.

Another feature of this invention relates to circuits, apparatus and methods for obtaining a signaling condition which is a function of the rate of change of the electrical condition of a scanning member as it passes between two adjacent segments which segments are usually connected to the respective line conductors of a signaling line.

Another feature of this invention relates to circuits, apparatus and methods for obtaining an output signaling condition of one character when the rate of change of the electrical condition of the scanning member exceeds a predetermined value and obtaining a different output of the electrical condition when the rate of change of the electrical condition of said scanning member does not exceed said predetermined value.

Another feature of this invention relates to circuits, apparatus and methods for scanning the respective conductors of signaling lines and deriving a predetermined electrical condition responsive to the closed condition of said line and for deriving a different electrical condition responsive to an open condition of said line.

In the exemplary embodiments of this invention described herein in detail, provision is made to scan, test, or sample the voltage condition of both sides or both conductors of a telephone subscriber's line. It is to be understood, however, that the signaling conditions of each of the line conductors of any type of a calling or signaling line circuit may be similarly tested, scanned, or sampled and that both line conductors of the trunk or toll line circuit may likewise be scanned or sampled in a similar manner in accordance with the present invention.

Briefly, in accordance with an exemplary embodiment of the present invention, a distributor or scanning mechanism is provided for a plurality of calling, signaling, subscriber or trunk lines or pluralities of groups of said lines. The distributor or scanning mechanism is provided with a segment for each conductor of each of the trunk lines, subscribers' lines or signaling circuits and each pair of segments is separated and shielded from an adjacent pair of segments which are assigned to and interconnected with another line by means of a shielding segment which is usually connected to some fixed or reference voltage or potential source which may include ground potential. Any suitable type of filter or filtering elements may be interconnected between the line conductors and the respective segments including interconnecting resistors, distributed capacity of the wiring conductors and also the capacity of the segments as well as any desired added capacity or other impedance and filter elements and networks.

A scanning arm is provided and rotatably supported so that it may be rotated past each of the line segments. In accordance with the present invention a scanning member passes adjacent to the line segments but does not engage or come in contact with them. The scanning element or member is shielded and the scanning member together with the shield which shield is also rotated with the scanning member are conected to an amplifying device which repeats the voltage applied to the scanning member to the shielding member and also to control circuits.

In one embodiment of this invention control circuits comprise a circuit for adding a magnitude of the voltage conditions induced in the scanning member as it passes adjacent the two segments of any given signaling path or line and then causes an output pulse to be generated which pulse has a fixed magnitude when the sum of the two scanned pulses exceeds a predetermined reference magnitude.

In accordance with another embodiment of this invention the control circuits comprise a differentiating circuit for differentiating the voltage condition of the scanning conductor and other control apparatus for generating an output pulse or voltage of predetermined character when the rate of change of the voltage of the scanning conductor exceeds a predetermined magnitude. In accordance with this embodiment of the invention switching circuits are provided for restoring the differentiating circuit to its initial condition and preventing the operation of the output circuits except when the scanning conductor passes between two segments interconnected with a signaling line. Control means are also provided for properly synchronizing the switching apparatus so that the differentiating means is rendered effective at the desired time. The output pulses are employed in combination with suitable control means for recording the electrical condition of the line.

In the exemplary embodiments set forth herein in detail the above-described scanning arrangements are arranged to cooperate with a magnetic storing or recording equipment such as described in my above-identified copending application. The scanning arrangement in accordance with the present invention may also be used in combination with other types of signaling systems, storage devices, etc.

The foregoing and other objects and features of this invention may be more readily understood from the following description of an exemplary embodiment thereof when read with reference to the attached drawing in which:

Fig. 1 shows the details of an exemplary embodiment of the invention in which a scanning and recording mechanism is employed for receiving and storing calling signals. In the arrangement shown in Fig. 1 the voltage induced on the scanning member when it passes one of the segments connected to a line is added to the voltage induced in the scanning member when it passes the other segment connected to the same line.

In the exemplary embodiments set forth herein the exemplary scanning arrangement in accordance with the present invention is designed to cooperate with a magnetic recording and storing mechanism.

Figures 1, 1A:
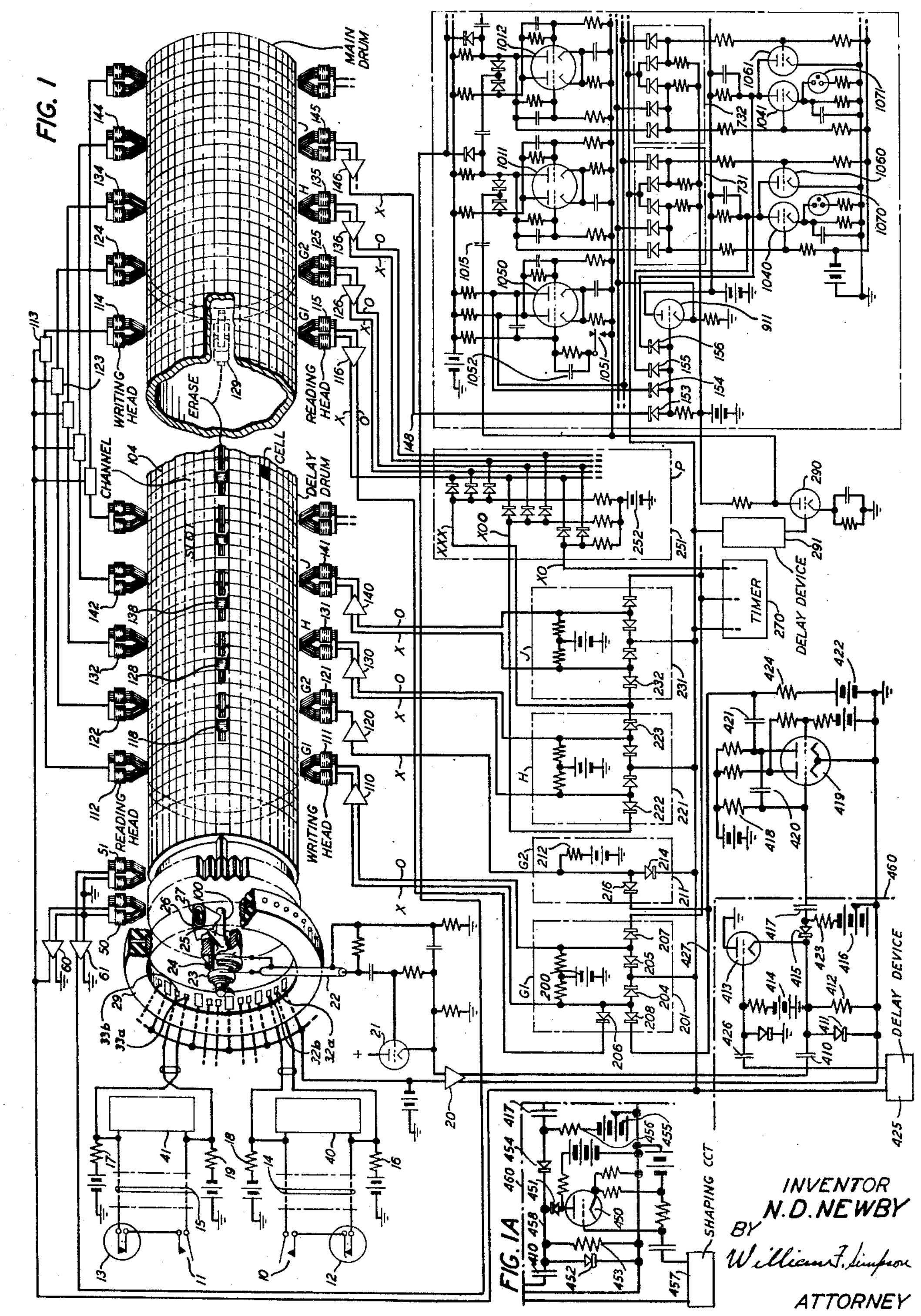
Fig. 1A shows details of the control circuit of another exemplary embodiment of this invention in which the rate of change of voltage of the scanning member as it passes from one of the conductors of a pair of conductors to the other conductor of the pair connected to a line is employed to control the recording in the magnetic drum.

Fig. 1 shows an exemplary embodiment of an electrostatic scanner and related circuits in accordance with the present invention which are suitable for use in combination with a magnetic drum for recording and storing calling signals such as dial signals employed in automatic telephone switching systems and other types of signals employed in other types of calling arrangements.

As shown in Fig. 1 in the exemplary embodiment set forth herein in detail a scanning member is mounted on the same shaft as the magnetic recording and storing drum so that it rotates at the same velocity and at the same relative position with respect to said magnetic drum. However, when desired, this scanning mechanism may be driven from some other shaft which may be geared to the magnetic drum driving means or otherwise synchronized with the drum or drum driving mechanisms.

The scanning device as shown in the upper left-hand portion of Fig. 1 comprises a rotating conductive arm 25 insulatedly mounted on shaft 100 which is the same shaft employed to rotate the drum 104. The end 27 of the rotating arm 25 passes adjacent to but does not touch or make contact with a plurality of segments 32*a*, 32*b*, 33*a*, 33*b*, etc. This arm in approaching each of the fixed segments forms a condenser with the respective fixed segments and has a voltage or current induced on or in the arm 25 in accordance with the voltage or potential of the individual segments to which this arm passes adjacent. The rotating arm 25 is surrounded by a shielding member 26 which rotates with but is insulatedly supported from the arm 25. The rotating element 26 is likewise insulatedly supported from the shaft 100. A pair of stationary rings 23 and 24 is provided and insulatedly supported around shaft 100. The ring 23 is electrostatically coupled to the rotating member 25 of the scanning or distributor mechanism and the stationary ring 24 is capacitatively coupled to the shielding member 26. While these rings 23 and 24 are shown in the drawing as being placed around and in close proximity to the respective rotating elements of the distributor or scanning mechanism with which they cooperate to form an electric circuit, it is to be understood that any suitable form of electrostatic capacitative coupling may be employed or that any other suitable type of coupling may include brushes resting on slip rings. However, the capacitative coupling is employed in the present embodiment of this invention because it is particularly well adapted for coupling to the rotating elements which in turn are capacitatively coupled to the segments 32*a*, 32*b*, 33*a*, 33*b*, etc., because this form of coupling introduces substantially no extraneous signals, noise currents or other interfering or stray currents which currents would interfere with the low level signals picked up by the rotating member 25 as will be described hereinafter.

The segments as shown in the drawing of the scanning or distributor mechanism are arranged in two groups, one group comprising pairs of segments assigned and connected to the various lines which are to be scanned or tested in succession and the other group comprising a group of shielding members or segments which segments separate each of the pairs of segments assigned to a given line. One segment of a pair is connected to the tip conductor of the transmission line and the other segment is connected to the ring conductor, the terms "tip" and "ring" conductors merely specifying or defining the different line conductors.

In an exemplary embodiment of this invention the recorder comprises a magnetic drum, the magnetic surface of which provides sufficient area, to be used in common by about a thousand subscribers' lines, each line having an arc of approximately .36 degree. A scanning electrode 25 is mounted on the shaft of the drum and its associated amplifiers 21 and 20 are employed to amplify the received signals sufficiently to actuate other devices and switching circuits.

Any suitable arrangement of the line electrodes and the scanning element may be provided. For example, the line electrodes may be arranged on a flat plate perpendicular to the rotating shaft and the scanning electrode arranged to be rotated adjacent these line electrodes. The line electrodes may be arranged on the inner surface of a ring as shown in the drawing and the scanning or distributing element arranged to rotate adjacent the inner surface of this ring and thus adjacent the line electrodes. As the scanning electrode 25 passes each of the line electrodes such as 32*a*, 32*b*, etc., the electrical condition of the line may be recorded in the space on the magnetic drum reserved for it as will be explained hereinafter. The sampling rate, that is, the speed of rotation of the scanning electrode must be sufficiently high to recognize each of the significant characteristics of the pulses or other received signals which are to be recorded. Assuming that the signals to be received are in the form of dial pulses, then the speed of rotation of the magnetic drum and also the scanning electrode 25 must be such that this electrode makes at least one complete revolution during each open interval of the dial and at least another complete revolution during each closed interval of the dial. When desired, the scanning electrode may make more than one revolution during each of these intervals and the system will operate in substantially the same manner as described hereinafter.

Inasmuch as the scanning electrode rotates at a relatively high speed and inasmuch as the line segments such as 32*a*, 32*b*, 33*a*, 33*b*, etc. are of relatively small dimensions measured in degrees of arc, the scanning circuit with its amplifier and other related equipment must be designed to respond to pulses of relatively short duration and, therefore, must be arranged and designed to respond to high frequency currents. If the calling or subscriber's line is subject to these high frequency currents, it will be desirable and sometimes necessary to provide suitable filtering elements between the line circuit and the electrostatic scanner. The filtering elements may be in addition to and they may include the capacity of the various segments and associated wiring and circuits as well as the resistance of the wires, circuits, etc., and also added resistance, capacity and inductance elements.

As shown in the drawing, each of the line segments for each calling line is connected to a resistor through which the line current of that line flows. Consequently, the voltage applied to the line segments of the scanning mechanism is the battery voltage either plus or minus the voltage drop across the line resistor connected thereto. When the line is open, i. e. idle, no line current will flow. Consequently, there will be no voltage drop across the line resistors with the result that substantially the entire battery voltage is applied to the electrodes of the given line. When line current flows as will be described hereinafter, the voltage drop across the respective resistors causes the voltage or potential applied to the scanning electrodes to be less than the battery voltage. In other words, when the line is idle the voltage difference between the two adjacent segments connected to a given line will be the maximum. When the line is closed line current flows over the line and through the resistors connected between battery and each of the line conductors so the voltage of each line conductor and thus of the distributor segment connected thereto tends to approach the voltage of the other as more and more line current flows and will be substantially equal to each other for short lines having little or no line resistance.

In the exemplary embodiment of this invention shown in the drawing, positive and negative batteries or sources of voltage are connected to the respective line conductors. However, the polarities of these batteries or sources may be reversed, or a single source of either polarity may be connected to either of the line conductors and ground connected to the other conductor and the scanning arrangement will operate equally well when suitable changes are made in the various bias voltages and the diodes poled in the proper direction and the line conductor scanned in the proper order.

Another element of the present recording mechanism comprises a magnetic storage device. In the exemplary embodiment of this invention set forth herein the magnetic material employed for recording and storing signals comprises a layer upon a rotating drum. However, any suitably moving layer or surface of magnetic material such as a disc, belt, etc., which moves in a closed or reentrant path may be employed equally well in combination with the circuits and other apparatus embodying this invention.

The drum employed in the exemplary embodiment set forth herein in detail may be constructed of suitable structural material as, for example, brass, bronze tubing, stainless steel tubing, aluminum tubing, or any other suitable type of structural material including plastic materials and other insulating materials, the purpose of the structural material being to provide a cylindrical surface which may be rotated about its axis by driving means of suitable type such as an electric motor. The drum may be driven directly by or by means of gears, belts or any other form of mechanical connection, and the motors energized from a suitable source of power, including batteries or other means. The speed of the motor is not critical and need not be maintained in synchronism with any other apparatus, so long as it rotates the shaft 100 and thus the drum 104 and the capacitative collector or distributor or scanning element 25 at the same speed and in synchronism with each other and sufficiently fast to provide one sampling interval for each line during each of the shortest signaling conditions on the line which it is desired to recognize.

The surface of the drum is accurately true running and is provided with a layer of magnetic material which an exemplary embodiment employing metallic drums may take the form of an electroplated coating of magnetic material, such as nickel-cobalt alloy or the like which has a thickness in the range from approximately .0003 inch to approximately .0006 inch.

A plurality of recording and pick-up coils comprising one or more windings on a ferromagnetic core structure are mounted in close proximity to the plated surface but not in contact with it. It will be convenient hereafter to speak of the recording process as "writing." The signals to be "written" or "recorded" are of a pulse-like character and have one or the other of two different values or characteristics, one being called X signals and the other 0 signals. The recording coils and the pick-up coils comprise a core structure having pole tips brought close together and placed in close proximity to the magnetic surface of the drum. Coils are wound on each of these cores and when employed for recording or writing the coil is employed to produce a magnetic flux across the pole tips which alters the magnetic condition of the surface of the drum. In the pick-up coils the magnetic condition of the drum induces a flux change between the pole-pieces and thus within the core structure of the pick-up coil. Consequently, a winding surrounding these cores has a voltage induced in it in accordance with the magnetic condition of the drum.

The circumferential area of the drum which passes immediately beneath the pole tips of a given coil or head is defined as a "channel" and that part of the channel which is directly under or immediately adjacent to pole tips of a given coil when a pulse of recording or writing currrent is applied to the coil is known as a cell or elemental area of the channel and is assigned to a given line. In the case of a multiplicity of recording coils or writing heads and a multiplicity of pick-up coils or reading heads, the aggregate of the elemental areas or cells which are under the several coils at any one instant of time is defined as a "slot" and is assigned to a given line. The group of cells or elemental areas assigned to a calling line pass under the respective coils at substantially the instant of time that the scanning electrode 25 is passing over the segment of the electrostatic distributor assigned to the same line. The simplest arrangement of such a slot is a rectangular area running parallel with the axis on the surface of the drum. It is to be understood, however, that in the usual case this slot will be more of a complicated form and is not therefore limited to such a rectangular area. When the various pick-up coils or recording coils or heads are staggered or arranged in the form of a helix around the drum the slot may be helical or may have a saw-tooth form or other discontinuous shape depending upon the location of the various recording and pick-up coils.

A recording amplifier is provided for each recording coil and is provided with two input leads designated X and O. These amplifiers are normally biased so that substantially no current flows in the recording coil windings. When it is desired to record an X signal a high positive voltage with respect to ground is applied to the X input lead and when it is desired to record an 0 signal a high positive voltage with respect to ground is applied to the O input lead.

A pick-up or reading amplifier is also provided for each pick-up coil. The pick-up or reading amplifiers have two output leads or terminals, one designated X and the other O. In the exemplary embodiment of this invention described in detail herein, when 0 signals pass under the polepieces of the pick-up coil connected to the respective amplifiers, a low positive voltage is applied to the X output leads or terminals and a high positive voltage is applied to the O output terminals. When an X signal passes under the pole tips of a pick-up coil, a high positive voltage is applied to the X output terminal of the pick-up amplifier individual to said coil and a low positive voltage is applied to the O output terminal by the respective pick-up amplifier.

In addition to the pick-up and recording coils located adjacent the magnetic drum described above, additional pick-up coils such as 50 and 51 are provided for generating timing and synchronizing pulses. As shown in the drawing these coils are located adjacent the periphery of the timing wheel 101 which is shown to be in the form of a gear wheel. Coil 50 is adjacent the wheel having a plurality of substantially uniform spaced teeth or poles while coil 51 is adjacent the timing wheel 102 having a single gear tooth or pole. Each of the teeth or poles of the wheel adjacent coil 50 generates a pulse which is employed to control the recording of signals in the drum as will be described hereinafter. During each revolution a single pulse is generated in coil 51 which is used to restore numerous circuits to their initial condition so these circuits may start from a given initial condition once during each revolution.

Consequently, errors in the circuits will not be additive for more than one revolution of the drum. While special coils 50 and 51 are shown adjacent the gear or tooth wheels for generating timing purposes, it is also within the scope of this invention to provide the timing pulses from pick-up coils such as 50 and 51 located adjacent channels on the magnetic drum which channels will have the synchronizing pulses recorded in them in any suitable manner such as by an oscillator or continuous pulse generator or the like. However, in the exemplary embodiment set forth herein the timing pulses are generated by means of the tooth wheels which are mounted upon the same shaft or at least driven at the same speed as the magnetic drum and usually from the same motor or other driving means. The output of coils 50 and 51 is amplified by the respective amplifiers 60 and 61. Output coil 50 and amplifier 60 are so designed that a high positive output pulse is obtained for each tooth of the gear wheel which passes under the pole-pieces of coil 50. The amplifier 60 contains the necessary pulse forming, pulse shaping means and means for otherwise controlling pulse characteristics as required. In an exemplary embodiment of this invention, the pulse output from amplifier 60 for each of the teeth of the gear wheel under coil 50 has a duration of approximately one-tenth the time required for a cell of the magnetic surface of the drum as defined above to pass under a pick-up coil. This pulse duration is not critical and satisfactory results may be obtained with pulses of such a duration.

The output from amplifier 61 comprises a pulse of high negative voltage or polarity for each revolution of the drum or revolution of the single tooth wheel. This pulse has a duration which is appreciably greater than the duration of the timing pulses obtained from amplifier 60 but still shorter than the time required for a cell to pass under a recording or pick-up head.

The signals to be recorded will comprise either one or the other of the two different signaling conditions such as voltage or potential conditions across the line resistor, depending upon whether the line is opened or closed as will be described. One of these signaling conditions is called an X signal herein and the other of these signaling conditions is called an 0 signal. These two different signaling conditions, i. e., X signals and 0 signals are represented by different currents or voltages or different voltage conditions or different current conditions in different circuits, conductors and terminals in the system. These X signals may also be represented by different magnetic conditions in parts of the equipment. These signaling conditions most frequently comprise a voltage or current of one polarity, i. e., positive or negative, of relatively high, large, or maximum magnitude and a voltage or current of the same polarity but of relatively low or minimum magnitude. When desirable these signaling conditions may be represented by other voltages or currents such as by positive and negative currents or voltages of the same or different magnitudes, or by current and no current, i. e., a current of substantially zero magnitude, or by a voltage and no voltage, etc.

The operation of the system may be better undertsood and the initial operation of the system improved, if it is assumed that the drum is initially magnetized by applying a substantially continuous current to each of the recording coils of the main recording drum or section and substantially saturating the magnetic material in the drum as it passes between the pole-pieces of each of the recording coils in one of the magnetic conditions caused by one of the two different types of signals or voltage conditions to be recorded in the drum. Thus it is assumed that this voltage will be in the same direction as produced by the so-called 0 signal when it is desired to record such a signal in the drum. Of course, the opposite or X signal will then comprise magnetizing the drum in the reverse direction between the pole-pieces. In some instances, it is desirable to provide a third type of magnetization which will produce no voltage in the pick-up or reading coil. Such a magnetic condition is readily obtained by orienting an additional coil adjacent to the same channel and rotating the pole-pieces with respect to the channel so that they are 90 degrees displaced from the pole-pieces of the recording coil and the corresponding pick-up coil. This additional coil is continuously supplied with a recording current or employs a permanent magnet to provide a continuous recording field between its pole-pieces. Thus an 0 is recorded in the magnetic material by orienting the so-called magnetic vectors in one direction, which direction causes a voltage of one polarity to be obtained from the pick-up coil or coils when this portion of the drum passes under the pole tips. The recording of an X signal will apply a reverse magnetization to the magnetic material and thus in effect will orient the magnetic vectors in a direction substantially 180 degrees from the first direction and thus cause a voltage of the opposite polarity in the pick-up coil. The erasing or third magnetic condition will cause the magnetic vectors to be rotated at an angle of 90 degrees to the first direction and thus cause no voltage to be induced in the output of the pick-up coil.

When only two magnetic conditions are required then the first or zero condition in general does not cause a voltage to be inducted in the pick-up coil, whereas the opposite magnetic condition representing an X signal causes a voltage of a predetermined polarity and wave shape to be inducted in the corresponding pick-up coil. It should be noted that the pick-up coils, recording coils and all of the control equipment therefore together with the electrostatic distributor or scanning mechanisms in accordance with this invention are common to all of the lines assigned to the slots on a given magnetic drum. The various elemental areas on this drum called "cells," however, are individually assigned to different ones of these lines and at all times during the call accurately record the electrical condition and the history of the electrical condition of that line. The cells or slots or elemental areas assigned to a given line are employed for recording the condition of only that line and are never employed to record the condition of any of the other lines individual to the drum.

Considering now the operation of the system and referring more particularly to Fig. 1, two lines 14 and 15 are shown in detail.

Each of these lines is provided with a calling switch such as 10 and 11, respectively, and dials 12 and 13 or other suitable signaling devices. These lines may be of different lengths from short lines to long lines which may extend over considerable distances as in the case of telephone subscribers' lines, annunciator lines, etc. Each line is connected to sources of electrical energy through resistor elements as shown in the drawing. For example, in the exemplary embodiment set forth herein the upper conductor of line 14 is connected through resistor 18 to a source of negative battery and the lower conductor is connected through resistor 16 to a source of positive battery. Likewise, the upper conductor of line 15 is connected to a source of positive voltage through resistor 17. The lower conductor of line 15 is connected to a source of negative battery through resistor 19. These line conductors are connected to adjacent scanning segments on the capacitative scanner such that the segment or line conductor connected to positive battery is scanned first and then the segment connected to negative battery scanned next. Thus, segment 32a is scanned first which segment is connected to the lower line conductor of line 14 and also to positive battery through resistor 16. Immediately following the scanning of segment 32a, segment 32b is scanned and this segment is connected to the upper conductor of line 14 and to negative battery through resistor 18. The two conductors of line 15 are similarly connected to the two segments 33a and 33b. Thus assuming first that the lines are idle, substantially the entire positive voltage of the battery is connected to segment 32a and substantially the entire negative voltage of battery connected to resistor 18 is connected to segment 32b. As a result, a positive voltage or pulse followed by a negative voltage or pulse is induced in the pick-up arm 25 as it is rotated past the segments 32a and 32b. This voltage is repeated by the cathode follower tube 21 which tube applies a similar voltage to the shielding member 22 and also to the shielding device 26 surrounding the pick-up or scanning arm 25. These voltages are also repeated by the tube 21 to the input circuit of amplifier 20 which amplifier repeats them and in the exemplary embodiment shown in Fig. 1 is assumed to repeat the similar pulses in its output circuit. Thus, when the positive voltage is induced in the pick-up arm 25 a similar voltage or voltage pulse of amplified magnitude and of short duration is repeated in the output circuit of amplifier 20. Likewise, when a negative voltage or pulse is induced on the scanning arm 25, a negtaive voltage or pulse of short duration is repeated in the output circuit of amplifier 20. These voltages are applied to the coupling condenser 410 and the diode or rectifier 411.

In the embodiment shown in Fig. 1 the diode or rectifier 411 may be a high vacuum diode or it may be a crystal device such as a germanium crystal, silicon crystal or other suitable type of uniconductional device. This rectifier is poled so that it opposes or presents a high impedance path to the flow of negative pulses from amplifier 20 but provides a relatively low impedance path for the flow of current due to positive voltages of pulses from amplifier 20.

Thus, in response to the positive pulse due to the scanning of segment 32a, current flows through the diode 411 from the amplifier 20 charging condenser 410 so that its left-hand terminal becomes charged positively with respect to the right-hand terminal by an amount substantially equal to the magnitude of the positive voltage or pulse output from amplifier 20 at this time. Then on the succeeding negative pulse from amplifier 20 in response to the scanning of the adjacent segment 32b, the rectifier or diode 411 passes substantially no current with the result that the magnitude of the pulse from amplifier 20 is added to the charge upon condenser 410 and the combined voltage applied to the combination of diode 415, battery 416 and resistor 423. The diode 415 together with biasing battery 416 are poled in such direction as to oppose negative pulses from the amplifier 20 and condenser 410 so long as these pulses are of less magnitude than the biasing voltage 416.

The diode 415 may be any suitable type such as described above for diode 411. It may be of the same type or another one of the various types outlined above for diode 411. The biasing potential 416 is illustrated as a tapped battery in the drawing. It is to be understood, however, that any suitable source of biasing voltage or potential may be employed including rectifiers, potentiometers, counterelectromotive force cells, etc.

The combined positive and negative voltages from amplifier 20 as applied to the diode circuit 415 will exceed the biasing potential from battery 416 when the lines such as line 14 is open. As a result, when this voltage exceeds the biasing voltage of the battery 416, a negative pulse is transmitted through the diode 415 and applied to the grid of the left-hand section of tube 419 through the coupling condenser 417.

Tube 419 has both its sections connected in a single cycle multivibrator circuit, that is, a multivibrator circuit having one condition of stability to which the circuit automatically returns. The circuit has an additional condition of temporary stability to which it may be actuated in response to an input signal and in which condition the circuit remains for a predetermined short interval of time after which the circuit automatically returns to its normal condition of stability. As shown in the drawing the circuit is arranged so that the circuit will have the left-hand section normally conducting and the right-hand section of tube 419 non-conducting. The circuit will remain in this condition until a negative pulse is applied through the coupling condenser 417 as described above. The negative pulse which exceeds a magnitude of biasing voltage 416 and transmitted through the coupling condenser 417 interrupts or reduces the current flowing through the left-hand section of tube 419. Due to the cross-coupling between the two sections of tube 419, current tends to start to flow through the right-hand section of this tube which in turn reduces the current flowing in the left-hand section with the result that the condition of stability of the circuits of the single cycle multivibrator tube 419 are operated to their condition of temporary stability. As a result, current flows through the right-hand section but not through the left-hand section of this tube in response to each of the pulses applied to the diode 415 which has a magnitude in excess of the voltage of the biasing source 416. Thus, when the line segments of a line which is idle are scanned, current is caused to flow through the right-hand section of tube 419. Current flowing through the right-hand section of tube 419 causes the voltage of the anode of this section to be reduced to a low value which in effect transmits a negative pulse through the coupling condenser 421 and effectively shunts the positive source 422 so that the voltage applied to the diodes 208 and 215 is insufficient to cause any signals to be recorded as will be described hereinafter.

The recording of the signals is controlled by the pulses from amplifier 60 as will be described hereinafter. After each pulse or signal has been recorded in response to a timing pulse from amplifier 60 as will be described hereinafter condenser 420 will become sufficiently charged so that the left-hand section of tube 419 will start to conduct and cause the current flowing through the right-hand section to be interrupted and the circuits of the single-cycle multivibrator restored to their normal and stable condition. The time constants of condenser 420 and its related charging and discharging circuits are so selected that this circuit returns to its normal condition as described above.

Each of the timing pulses which controls the recording of signals is also applied to a delay device 425 which delays these pulses for a sufficient interval of time so that ample time is provided to permit recording and storing as described hereinafter.

At the end of such an interval of time a delayed pulse from the delay device 425 is applied through coupling condenser 426 to the control grid of tube 413. This pulse causes current to flow through tube 413 and discharges the right-hand terminal of condenser 410 so that at the termination of the pulse from the delay line 425, condenser 410 will be again in condition to respond to the voltages from amplifier 20 in response to the scanning element 25 passing adjacent the next succeeding pair of line segments which segments will be connected to another calling or subscriber's line. In discharging condenser 410 as described above, a positive pulse may be applied to the control grid of the left-hand section of tube 419 which positive pulse may aid in restoring the circuits of this tube to their normal condition as described above.

Thus, so long as the lines remain open a negative pulse is repeated through the diode 415 to the left-hand grid of tube 419 which in turn causes the current flowing through the left-hand section of tube 419 to be interrupted and current to flow through the right-hand section of this tube. As a result, insufficient voltage is applied to the lead 427 to the recording equipment to cause any recording or storing at this time.

Assume now that the subscriber closes switch 10 which completes a circuit over his line so current flows from the positive battery connected to resistor 16 and over the line conductors of line 14 to negative battery connected to resistor 18. This current causes voltage drops across resistors 16 and 18 which voltage drops reduce the magnitude of the voltage applied to the two segments 32*a* and 32*b*. Consequently, voltage pulses of reduced magnitude are repeated by amplifier 20 as the scanning arm 25 passes adjacent the segments 32*a* and 32*b*. The reduction in magnitude of these voltages is sufficient so that the sum of the magnitudes of the two voltages is less than the voltage of the biasing source 416. Consequently, no voltage is repeated through the diode 415 at this time. As a result, the left-hand section of tube 419 remains conducting and the right-hand section remains nonconducting. At this time the shunting negative pulse is not applied to the coupling condenser 421 with the result that substantially the entire voltage of battery 422 is applied to the input lead 427 of the magnetic recording equipment which equipment responds and causes a signal to be recorded as will be described hereinafter.

Should either side of the line become inadvertently grounded the voltage applied to the corresponding segment 32*a* or 32*b* will be reduced to such a value that this voltage together with the voltage from the opposite side of the line when added together by the summing circuit in the manner described above is insufficient to overcome the biasing voltage 416 with the result that the line will appear to have a permanent signal or trouble condition applied to it which condition may be recognized by suitable circuits at the central office.

In the embodiment of this invention as shown in Fig. 1A, Fig. 1A is substituted for the portion of Fig. 1 below and to the left of line 460, the circuits and apparatus are arranged to respond to the change in voltage condition on each scanning conductor. Referring to Fig. 1A, for example, the output of the scanning amplifier 20 is applied through the coupling condenser 410 to a differentiating and switching circuit comprising tube 450 and diodes 451, 452 and 454 as well as resistors 453 and 456. Tube 450 is employed as a switching tube and is normally biased so that this tube is non-conducting. As a result, a sufficiently high positive voltage is connected to the diodes 451 and 452 in the forward direction so that these diodes have a very low resistance or impedance and thus maintain a substantial shunt or short-circuit upon the conductor 458. Likewise, the biasing battery 453 is poled in such a direction as to bias the diode 454 in the back or reverse direction so that its impedance is high and permits substantially no current to flow from conductor 458 through the coupling condenser 417. As the scanning electrode 27 passes from one segment to the adjacent segment, the two segments connected respectively to the two conductors of a line, a positive pulse is applied to the control element or grid of tube 450 which causes this tube to become conductive. This pulse is applied through the shaping circuit 457 from the output of the timing amplifier 60. The shaping circuit 457 may include suitable delay or phasing equipment to properly time the pulse so that it is applied at the time indicated. The pulse may be of any suitable length and may start when the sensing conductor is adjacent the first of a pair of segments connected to a line and end when the sensing conductor arrives adjacent to the second segment. The length of this pulse may be varied so as to include most of the time when the scanning conductor is adjacent both of these segments or it may be shortened so that it includes only the time the scanning conductor is between the two segments connected to a given signaling line.

The application of a positive pulse to the grid of tube 450 at this time causes current to flow in the output or anode-cathode circuit of this tube. Inasmuch as the cathode is connected to a negative voltage the anode voltage is reduced to a lower voltage than is ever developed upon conductor 458 due to the operation of the signaling circuits as will be described hereinafter. As a consequence, the bias on the diodes 451 and 452 is reversed so that these diodes become nonconducting and of a high resistance, thus removing the circuit or shunt from the conductor 458. At this time the voltage applied from the amplifier 20 will be changed from a relatively high positive voltage to a relatively low positive voltage or to a high or low negative voltage or, in other words, changed in a negative direction or manner. This voltage change is applied to the coupling condenser 410 which causes a voltage drop across resistor 453. The voltage drop across resistor 453 at this time is substantially proportional to the rate of change of the output voltage from amplifier 20 as applied through the condenser 410. Condenser 410 is made sufficiently small as is resistor 453 so that the time constant of this combination is relatively short. In other words, the current flowing through resistor 453 at this time is controlled by the condenser 410 rather than by the magnitude of the resistor 453.

As pointed out hereinbefore, if the line is open, substantially full line battery is applied to the segments connected to the open line with the result that the voltage on these signals will be a maximum value. Consequently, since the scanning conductor travels at a substantially uniform speed or velocity the rate of change of voltage of the scanning conductor as it passes from one segment connected to a given open line to the other segment connected to the open line will be a maximum.

Likewise, if the line is closed the voltage applied to the two segments is reduced due to a voltage drop as described herein with the result that the voltage of the two segments connected to any given line tends to approach each other with the result that the voltage difference between these segments becomes much less and in the case of a short line approaches zero. As a result when the scanning element passes from one segment to the adjacent segment which is connected to the conductors of a closed line much less voltage change is induced on the scanning conductor and since this conductor travels at a substantially uniform angular speed or velocity as pointed out above the rate of change of voltage of the scanning element is much less.

The voltage applied across resistor 453 at this time due to the change in voltage on the scanning element 25 as obtained from the scanning amplifier 20 is connected through diode 454 to the output coupling condenser 417 which condenser is in turn connected to the left-hand grid of the tube 419. If the rate of change of voltage on the scanning element is a maximum the voltage drop across resistor 453 will be a maximum with the result that this voltage will be of sufficient magnitude to overcome the bias battery voltage 455 and thus reverse the bias on the diode 454 with the result that this diode will become conducting and present a low impedance to the voltage developed across resistor 453 at this time and cause this voltage to be applied through the coupling condenser 417 to the left-hand control grid of tube 419.

On the other hand, if the line is closed as the scanning conductor 27 moves from one of the segments connected to the closed line to the other segment connected to this closed line the voltage developed across resistor 453 will be less than the biased voltage from battery 455 with the result that the bias on the diode 454 does not reverse. Consequently, this lower voltage is not transmitted to the condenser 417 but is instead attenuated by the high impedance of the diode 454. As a result, a negative voltage or pulse is transmitted through condenser 417 to the control grid of the left-hand section of tube 419 in response to an open line whereas no such voltage is delivered to this grid in response to a closed line. Tube 419 operates at this time as described herein in the same manner as described with reference to Fig. 1. Consequently, a positive pulse or signaling condition is applied to the output conductor 427 when the line is closed and a low or negative voltage is applied to conductor 427 when the line is open.

After the termination of the pulse applied to the control grid of tube 450, tube 450 ceases to conduct with the result that a high positive voltage is again applied to the lower terminal of diode 451 which voltage again passes diodes 451 and 452 to the conducting direction and effectively discharges the conductor 458 and the right-hand terminal of condenser 410 and thus restores the differentiating circuit to its initial condition and maintains it in this condition until another positive pulse is applied to the control grid of tube 450 as the scanning conductor then passes from one segment to the other which segments are connected to line conductors of another line. At this time the above-described operation will be repeated. This operation is repeated for each of the lines in rotation and when the scanning conductor again returns to the first line, the operation described above is again repeated. This operation is thus repeated for each revolution of the drum or scanning element.

Thus, so long as the lines remain operative and idle, the voltage of lead 427 is maintained sufficiently low at the recording or sampling periods, which are controlled by the output of amplifier 60, so that no signals are recorded in the manner described hereinafter. However, when the subscriber desires to make a call the line circuit is closed and line current flows over the line and as a result a sufficiently positive voltage is applied to the lead 427 to cause a signal to be recorded or stored in the magnetic equipment in the manner set forth hereinafter. Thus, each time the distributor arm or scanning element 25 passes segments 32a and 32b when the line 14 is open the voltage of lead 427 is reduced to such a value that the gate circuits G1, 201 and G2, 211 either do not respond to this voltage or else these circuits cause 0 signals to be recorded at these times. However, each time the scanning element 25 passes segments 32a and 32b when line 14 is closed the voltages on lead 427 are not reduced so that the positive voltage from battery 422 is applied to gate circuits 201 and 211. The gate circuits respond to this high positive voltage and cause X signals to be recorded as will be described hereinafter.

The operation of the system in response to signals from other lines such as line 15 and other lines, trunks, and circuits not shown, is substantially the same as described above with reference to line 14; each of the line conductors of these other lines being scanned in succession and the output from the scanning of the two line conductors of each line or circuit combined and employed to control the recording and storing equipment.

The signals recorded in the magnetic equipment are called X signals when line current flows over line 14. After the line has once been closed on a call and then opened the magnetic equipment is arranged to record this open condition. The recording of the open condition under these circumstances is called an 0 signal.

Figure 2:
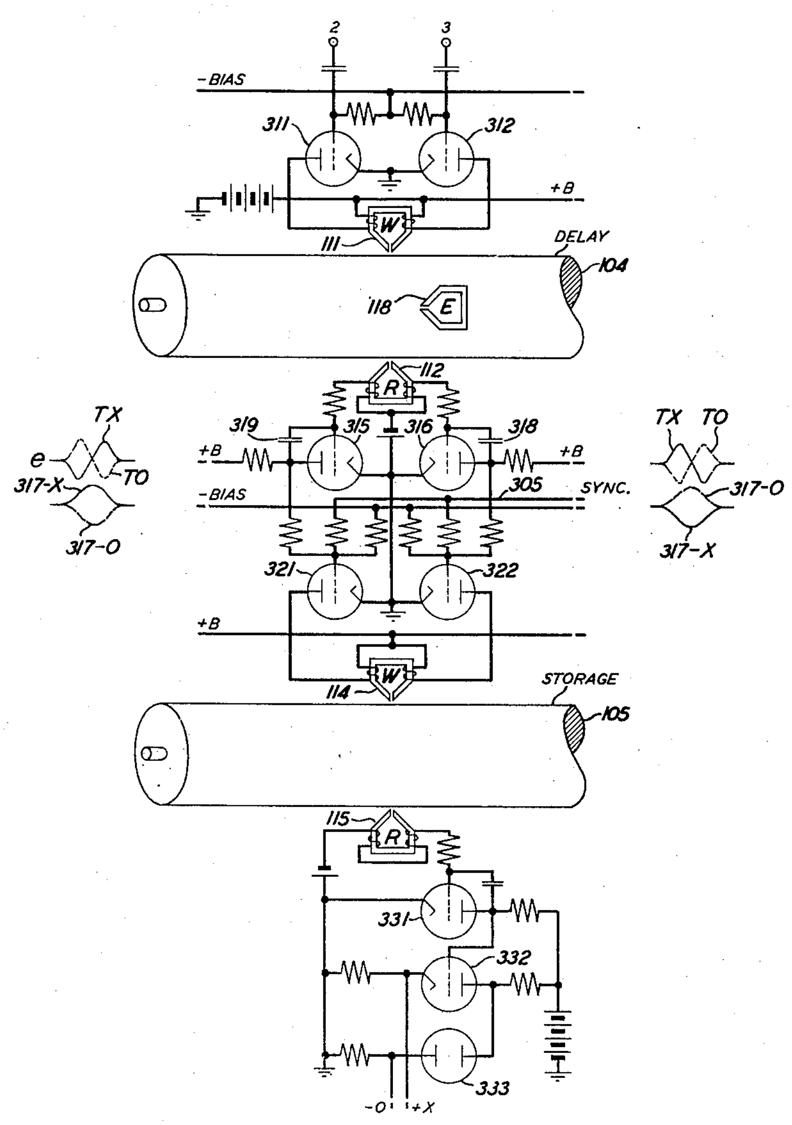
Fig. 2 shows in detail the amplifier circuits required to receive, record and respond to recorded signals.

For convenience in referring to these directions of magnetization the left-hand coil of head 111, for example, as shown in the drawing is assumed to produce a direction of magnetization in elemental areas of the drum called an X signal while the right-hand coil is assumed to produce a direction of magnetization in the elemental areas of the surface of the drum called an 0 signal. It is to be understood, however, that the coils that produce the X signal and the coils that produce the 0 signal may be wound upon both of the pole-pieces of the recording head 111. As shown in the drawing the coils of the recording head 111 are connected to the output circuit of a recording or writing amplifier 110. As shown the amplifier 110 is provided with two input leads, one designated X and the other O. Both of these leads are normally maintained at a relatively low voltage near ground potential by the gate circuit 201. These input leads connect to terminals 2 and 3 of amplifier 110 which are coupled through condensers to the grids of the respective tubes 311 and 312 as shown in Fig. 2. In the exemplary embodiment the input grids of the amplifier tubes 311 and 312 are normally maintained or biased at a negative voltage with respect to ground and as a result no output current flows in the output circuit of amplifier 110 so that under these conditions the magnetic conditions of the surface elements of the drum passing under the pole tips of coil 111 are not changed.

Gate circuits such as G1 comprise a plurality of rectifiers or diodes which may be of the germanium crystal type, or other suitable forms of crystals or combinations of crystals or high vacuum diodes. The gate circuits have an input circuit shown at the bottom of the rectangle such as 201 which is connected to the output of the synchronizing amplifier 60. The gate circuit has input circuits shown at the left-hand side of the rectangle or box 201 which in turn are connected to the rectifiers 206 and 208. This gate circuit also has an input lead shown at the right-hand side of the rectangle in turn connected to the rectifier element 207. Each of the input leads to the gate circuits have either one or the other of two different voltage or current conditions applied to it. In the exemplary system described herein in detail the gate circuits are arranged to have their input circuits or terminals connected to relatively low impedance circuits which will apply either a high positive voltage of say about 75 volts or more to the input terminal or a low positive voltage of say about 25 volts or less thereto.

So long as a low positive voltage is applied to any one or more of the inputs current flows from battery 200, and from any of the other inputs having a high positive voltage applied to it, through the diode connected to the relatively low positive voltage with the result that the common point which comprises an output from the gate circuit is maintained at or near the voltage of the relatively low voltage applied to that input lead or leads. When the voltage applied to all of the input terminals on the left-hand side is a high positive voltage, the gate circuit is arranged so that it will apply a high positive voltage to the X input lead to amplifier 110 in response to a high positive synchronizing pulse supplied from the synchronizing amplifier 60 to the common point between the diodes 204 and 205, with the result that this change in voltage causes an X signal to be recorded in the corresponding cell or unit area in the surface of the drum passing under the recording coil 111 at this time. Likewise when a high positive voltage is applied to the input lead connected to the diode 207, a high positive voltage is repeated to the O input lead to amplifier 110 when a high positive synchronizing pulse is applied from the synchronizing amplifier 60 to the common point between the diodes 204 and 205 with the result that an 0 is recorded in the magnetic element of the drum passing under the recording head 111 at this time.

The gate circuits such as G1 shown within the rectangle 201 may be arranged in a plurality of different manners. These gate circuits may be arranged so that a high positive voltage applied to any one of the input leads will cause a high positive voltage to be repeated to the corresponding output lead in response to the application of a synchronizing pulse from the synchronizing lead. Such gate circuits are sometimes called "or" gate circuits, that is, circuits in which outputs appear in response to a high positive voltage applied to any one or more of the input leads. Alternatively, the gate circuits may be arranged such that a high positive voltage has to be applied to all of the input leads or all of a group of the input leads before a high positive voltage is repeated to the corresponding output lead. Such circuits are frequently called "and" circuits. Such circuits are obtained by applying suitable potentials to the diode elements and properly orienting the diode element. These circuits may also be arranged so that combinations of the two types of circuits may be employed when desired. Furthermore, the voltages applied to these circuits may be such that input voltages so applied to the input leads prevent a high positive output pulse instead of permitting one, as described above.

For example, with respect to the gate circuit G1, it is necessary for a high positive voltage to be applied to the right-hand terminal of the diode 207 to cause an 0 signal to be recorded by the recording coil 111 in response to a high positive synchronizing pulse from the synchronizing amplifier 60.

With respect to the inputs required to cause the recording coil to record an X signal in the corresponding cell of the magnetic drum, the voltage of both of the input leads on the left-hand side of the gate G1 must be a high positive voltage. However, in the absence of a recorded X signal passing under the pick-up coil 115 at this time the output from the X lead from amplifier 116 is a low positive voltage and the output from the O lead of amplifier 116 is a high positive as will be described hereinafter with the result that a high positive voltage is applied to the diode 206. Consequently, when the voltage of lead 427 becomes more positive in response to the scanning electrode 25 passing over segments connected to a closed line a high positive potential is applied to the left-hand terminal of the diode 208 and as a result when the synchronizing pulse from the amplifier 60 is applied to the gate G1, the voltage of the X signal input lead to amplifier 110 becomes a high positive voltage and causes an X signal to be recorded in the corresponding cell under the recording head 111 at this time. No high positive voltage is applied to the O input lead to amplifier 110 at this time. Then the arm 25 will move on to the next pair of segments or terminals of the distributor or scanner. In case the next line is also busy or has current flowing over it, an X signal will be written or recorded in the next cell. Conversely, if the next line has no current flowing in it at this time, an X signal will not be written or recorded in the succeeding cell because the lead 427 will not be sufficiently positive and thus will not cause the application of a high positive voltage to the left-hand terminal of diode 208.

After the above-described X signal is written in the cell asigned to line 14, in the manner described above, this cell will pass around the drum and pass under the pick-up coil or reading head 112 and cause an output voltage to be developed in the winding of this head or coil. The output coils from the pick-up head 112 are connected to transfer amplifier 113 which causes the corresponding X signal to be recorded by the recording head 114 in the cell passing under this recording coil at this time. The X signal recorded by the recording head 111 then continues around the drum and passes under the erasing head 118. The erasing head comprises a permanent magnet or a continuously energized electromagnet oriented in such direction that the magnetization of the drum after passing under this head produces no output voltage in any of the pick-up coils under which this portion of the drum will pass. During the time the cell in which the X was recorded by the recording head 111 is rotating from the pick-up head 112 to the erasing head 118 and then on to the recording head 111 again, the X recorded by the recording head 114 is also rotated around the drum so that at approximately the same time that the pick-up arm 25 again passes opposite segment 32*b* connected to line 14 in the manner described above, the X signal recorded in the cell assigned to line 14 on the drum in the channel associated with head 115 will pass under head 115. As a result the voltage induced in the pick-up head 115 and amplified by amplifier 116 causes a high positive voltage to be applied to the output X lead of amplifier 116 and causes a low positive voltage to be applied over the output O lead from amplifier 116 to the left hand terminal of diode 206 at this time, so that when this next high positive voltage applied to lead 427 from the scanning mechanism due to the scanning of line 14 and the next corresponding high positive synchronizing pulse from the amplifier 60 are applied to diodes 208 and 204 and 205, the voltage of the X input lead to amplifier 110 is prevented from becoming positive. Consequently, no further signals will be recorded by the head 111 at this time so no further voltages will be induced in the pick-up head 112 by the cell in the channel under head 111 assigned to line 14. However, the X signal recorded in the cell in the channel under heads 114 and 115 assigned to line 14 will remain until removed or changed in the manner described hereinafter.

The voltage from lead 427 is also applied to the left-hand input terminal of the gate G2 shown within rectangle 211 in Fig. 1. This gate is in turn connected through an amplifier 120 to a recording head 121 which amplifier and recording head are arranged to write or record only X signals upon the corresponding channel of the drum. Thus, each time the synchronizing pulse from the amplifier 60 is applied to the diode 214, a high positive pulse appears on the X lead from gate 211 when positive voltage is also applied to the diode 216 from lead 427. As pointed out above, such a high positive voltage is received from lead 427 and thus applied to the diode 216 each time the distributor or scanner arm 25 passing adjacent the segments of a line over which line current is flowing with the result that an X signal is written in each of the cells in the channel under the recording head 121 assigned to the respective lines having current flowing over them. When these cells pass under the pick-up head 122, they induce voltages therein which are repeated by the repeating or transfer circuit 123 to the recording head 124 which records corresponding X signals in the corresponding cells in this channel assigned to the respective lines.

Returning now to the X signal recorded in the cell assigned to line 14 in the channel under the head 122, as the drum rotates this cell passes from under the head 122 to the erasing head 128. At this time this X signal is erased and the cell then continues to travel around the drum and again passes under the recording head 121 where an X signal is again written in this cell if current is still flowing in the line at this time. As pointed out above, the scanning arm 25 will again pass adjacent to segments 32*a* and 32*b* at this time.

Consider now the X signal written or recorded by the recording head 124. As the drum rotates, this X signal will pass under the reading or pick-up head 125 and cause an output in the output amplifier 126 indicating that an X signal was recorded in the corresponding cell in a channel under the recording head 124. As this cell or area continues to rotate, it will pass under the erasing head 129 which changes the magnetization of this cell so that it is no longer capable of inducing any voltage in the pick-up head 125. However, as pointed out above, if current continues to flow in the line so that an X signal is again written or recorded by head 121, the corresponding voltage will again be induced in the pick-up head 122 and transferred to the recording head 124 and recorded in the same cell assigned to line 14. The above operations then continue for each of the lines so long as line current flows over the lines. At this time it should be noted that the channel under the heads 111 and 112 does not have either an X signal or an 0 signal recorded in them; the previous recordings having been erased. The channel under the heads 121 and 122 has an X signal written or recorded in each of the cells each time these cells pass under recording head 121 so long as the corresponding line has current flowing in it. The X signals written in this channel are continually transferred to the recording head 124. X signals recorded by the recording head 124 in turn induce output voltages in the pick-up head 125 and then are erased by the erasing head 129 associated with the channel of heads 124 and 125.

The above-described operation of the various heads, coils, circuits, amplifiers, gates and scanning mechanism has been described with reference to line 14. The circuits respond in a similar manner to current flowing over line 15 and to all the other lines connected to the respective segments of the electrostatic scanning mechanism. As pointed out above, the voltage condition across the corresponding resistances of the respective lines causes X signals to be written in the cells of the respective channels described above assigned to the respective calling lines. The condition of each of the calling lines is thus recorded in a predetermined cell or unit area on the surface of the magnetic drum assigned to the respective lines.

So long as the line 14 remains closed the potential of the lead 427 will be at its more positive value each time the scanning arm 25 passes segments 32*a* and 32*b*. However, the X signal recorded in a channel under coils 114 and 115 will prevent any recording by the recording coil 111 at this time. X signals will be recorded by recording coil 121 of the delay portion of the drum at each of these times, which X signals are transferred to the recording portion of the drum and recorded therein by coil 124. At each of these times except the first one as described above, high positive voltages exist at the X output leads and low voltages exist at the O output leads from amplifiers 116 and 126 due to the X signals recorded in the cells or elemental areas of the drum assigned to line 14, for example, as these areas or cells pass under the pick-up coils 115 and 125.

In response to an opening of the line by the contacts of the dial 12 or contacts 10 or otherwise the potential drop across resistors 16 and 18 falls to zero with the result that the voltage of lead 427 again becomes more negative as the rotating element 25 again passes segments 32$a$ and 32$b$. As a result an X signal will not be recorded by either of the recording coils 121 or 111 and thus an X signal will not be recorded by the recording coil 124. As a result the next time the cell under coil 124 assigned to line 14 passes under the pick-up coil 125 positive voltage appears on the output lead O instead of on the X lead of amplifier 126. At the same time the X signal initially recorded by the recording coil 114 will pass under the pick-up coil 115 and cause a high positive voltage pulse transmitted over the X lead from amplifier 116.

The outputs of amplifiers 116, 126 and 136 are connected to a translating or combining circuit 251. The combining circuit 251 comprises a plurality of two-element diodes which may be of a high vacuum type but as indicated in the drawing, these elements may also comprise crystal rectifiers of any suitable type including germanium and other types of rectifying contacts, semiconductors and the like.

As indicated on the left of the rectangle 251 an XO lead extends from this rectangle which lead has a rectifier or diode connected between it and the X output lead from amplifier 116. The XO lead also has a rectifier connected between it and the O lead from amplifier 126. These rectifiers are poled in such a direction that the voltage on the XO lead is at a low value so long as the voltage on the X lead from amplifier 116 or the O lead from amplifier 126 is at a low value. If either of these outputs is negative the corresponding rectifier will conduct appreciable current from the battery 252 and thus maintain a voltage of the XO lead at a relatively low value near the lowest value voltage applied to either X lead from amplifier 116 or the O lead from amplifier 126 whichever of these two leads is the lowest in voltage.

However, when an X passes under the pick-up coil 115 and a 0 passes under the pick-up coil 125 substantially simultaneously therewith, positive voltage appears on the X lead output from amplifier 116 and on the O lead output from amplifier 126. As a result a high positive voltage is also applied to the XO lead at this time.

Due to the previous magnetization of the other portions of the drum the output from the amplifier 136 will be a high positive voltage on the O lead and a low positive voltage on the X lead at this time and until an X is recorded in the corresponding cells passing under these coils assigned to the line 14.

As a result a high positive output voltage appears on lead XOO at this time. The XOO lead has a rectifier or diode connected between it and the X output lead from amplifier 116 and a diode connected between it and the O output lead from amplifier 126 and a diode connected between it and the O output lead from amplifier 136. These rectifiers are poled in such a direction that the voltage on lead XOO is low so long as the voltage of any of the above-identified leads from the amplifiers 116, 126, 136 is a low positive voltage. However, as described above, the first time after line 14 has been opened and the slot assigned to this line passes under the pick-up coils 115, 125 and 135, a high positive voltage appears on the output leads from amplifiers 116, 126 and 136 connected to lead XOO through the diodes as described above. Consequently the voltage on lead XOO becomes high at this time. At the same time another cell or elemental area of the surface of the drum or cylinder assigned to line 14 passes under the recording coil 131. The high positive voltage on lead XOO which is connected to the diode 222 in the gate circuit 221 causes a high positive voltage to be repeated on the X output lead of gate circuit 221 in response to a high positive synchronizing voltage pulse from amplifier 60 and the diode of gate circuit 221. This X output lead extends to the recording amplifier 130 and the high positive voltage on this X lead in turn causes the recording coil 131 to record an X signal in the elemental area under this recording coil assigned to line 14. After a delay interval this X signal is transferred to the recording coil 134 and recorded in an elemental area under this coil at this time which elemental area is likewise assigned to line 14. When the X recorded by the recording coil 134 passes under the pick-up coil 135, it will cause the output on the O lead from amplifier 136 to be low and the voltage applied to the output X lead from amplifier 136 to become high. As a result positive voltage does not again appear on the XOO lead because the output voltage of the O lead from amplifier 136 is now low and thus maintains the voltage low on the XOO lead.

After the X signal recorded by the recording coil 131 passes under the pick-up coil 132 and is transferred to the recording coil 134 as described above, it is erased by the erasing magnet or coil 138. Thus when the X signal passes under the pick-up coil 135 as described above, no high positive voltage appears on the X lead to the recording amplifier 130 and an X signal is not recorded in the elemental area assigned to line 14 at this time. The X signal remains recorded in the elemental area assigned to line 14 associated with the pick-up coil 135 until changed as will be described hereinafter.

So long as line 14 remains open no further signals are recorded by any of the recording coils 111, 121, 114 or 124 with the result that high positive voltage appears on lead XO each time the arms passes segments 32$a$ and 32$b$ and thus each time the X originally recorded by the coil 114 passes under the pick-up coil 115 in the manner described above. These high positive voltages are transmitted to a counting or timing circuit 270 and employed to indicate a disconnect or termination of the call in a manner to be described hereinafter.

However, assume that before any disconnect or termination signal is recognized due to the operation of the counting or timing circuit 270, line 14 is reclosed. As a result the voltage on conductor or lead 427 becomes more positive when the distributor arm 25 next passes segments 32$a$ and 32$b$. As a result an X signal will be recorded by the recording coil 121 in the delay section of the magnetic drum. A short interval of time later an X signal will be recorded by the recording coil 124 in the cell or elemental area thereunder assigned to line 14 in a manner described hereinbefore. When this portion of the drum passes under pick-up coil 125 the X signal originally recorded by the recording coil 114 also passes under the pick-up coil 115 with the result that high positive voltage appears on the X output leads from amplifiers 116 and 126 and a low voltage is obtained from the O output leads from these amplifiers.

The XXX lead from the translating or combining circuit 251 has a diode connected between it and the X output leads from each of the amplifiers 116, 126 and 136 with the result that a high positive voltage is obtained from this lead the first time the X originally recorded by the recording coil 114 and the X recorded by the coil 124 and the X recorded by recording coil 134 pass under the pick-up heads 115, 125 and 135 after the line 14 has reclosed.

Lead XXX extends to the diode 223 of the gate or translating circuit 221 and also to the diode 232 of the gate circuit 231. The high positive pulse applied to the diode 223 at this time causes an 0 signal to be recorded in the cell or elemental area of the drum assigned to line 14 under the coil 131 at this time. Likewise, a high positive voltage on lead XXX at this time applied to the diode 232 causes an X signal to be recorded by the recording coil 141 which X signal is later transferred to the recording coil 144 and recorded in another cell or elemental area of the drum under coil 144 which is likewise assigned to line 14.

The 0 signal recorded in the cell under coil 131 later passes under the pick-up coil 132 and is transferred to the recording coil 134. At the time this 0 signal is applied to the recording coil 134 the X signal previously recorded in the cell which is now under this coil and assigned to line 14, will be written over or changed to an 0 signal and thus in effect canceled and an 0 signal substituted therefore. Thus after the elemental areas assigned to line 14, pass under the coils 114, 124, 134 and 144 there will be X, X, 0 and X signals respectively stored or recorded in them.

Thus in response to the closure of a calling line such as 14, an X signal is recorded by coils 111 and 114 in the cells or elemental areas assigned to said line 14. These areas are in the channel designated G1. In response to the subsequent opening of the calling line 14 an X signal is recorded by coils 131 and 134 in the areas assigned to line 14. These areas are in the channel designated H herein. In response to the subsequent reclosing of the calling line 14 an X signal is recorded in the elemental areas or cells under coils 141 and 144 assigned to line 14. These areas are in the channel on the magnetic drum designated channel J herein.

Any of the above signals or sequences of signals, i. e., the closure of a calling line, the closure of the calling line followed by the opening thereof, or the closure of the calling line followed by an opening of that line which opening is followed by a reclosure of the line, may comprise a calling signal and the exemplary embodiment described in detail herein may be arranged to recognize and respond to any or all of the above calling signals. As shown in Fig. 1 the input lead 148 to the register and display apparatus is connected to the X output lead from amplifier 146 of channel J. Consequently, this equipment responds to the last type of call signals enumerated above. However, by connecting a lead similar to 148 to the X output lead from the amplifiers of other channels, such as G1 or H, instead of from channel J the system will respond to the other call signals described above. When desired additional register and display equipment may be provided and connected to different ones of the channels for responding to different types of call signals.

In order to display the call it is necessary that the display or registering mechanism be idle and properly reset to a zero condition. This registering equipment as shown in Fig. 1 comprises a plurality of counter tubes 1011, 1012, etc., reset multivibrator tube 1050, a group of registering tubes 1040, 1041, etc., indicating tubes 1070, 1071, etc., and reset tubes 1060, 1061, etc. A control and combining circuit comprising the diodes 153, 154, 155 and 156 together with a repeating cathode follower tube 911 is provided for controlling the registering equipment. The restoring multivibrator tube 1050 is arranged so that the conduction within the sections of this tube automatically returns to the normal conditions after a restoring or reset operation. The circuit of multivibrator tube 1050 is arranged so that with key 1051 unoperated, as shown in the drawing, the left-hand section will be conducting and the right-hand section non-conducting due to the connection of the grid of the left-hand section to a more positive bias voltage than that applied to the grid of the right-hand section. Under these circumstances the voltage of the anode of the left-hand section is at a relatively low value so that the right-hand sections of gates 731, 732, etc. are blocked at this time. The voltage of the anode of the right-hand section of tube 1050 is at its most positive value when the right-hand section is conducting substantially no current. As a result, the positive voltage is applied to the upper terminal of diode 154, which voltage is in such a direction that it produces substantially no current flow through the diode because it is in a reverse direction to the mode of easy conduction of the diode.

The counter tubes 1011 and 1012 comprise two representative stages of a multistage binary counter employed to designate the line over which the calling signal or signals originate. In the binary number system each place or denominational order of a number has either one of two different digits, i. e., a one or a zero. The tubes 1011, 1012, etc., represent each stage or denominational order and conduction of current by one section of such a tube represents a zero for that stage or denominational order and the other section conducting represents a one for that denominational order. These counter stages are arranged to be reset once per revolution of the drum 104 as will be described hereinafter. Thereafter they count each of the synchronizing pulses which define the unit areas individual to the respective lines. In the exemplary embodiment of the present invention a synchronizing pulse is generated for and defines each of the elemental areas under the pick-up coils assigned to the individual calling lines and these elemental areas assigned a line are under the various pick-up coils as described above when the arm 25 passes the segments connected to that line. Consequently, the condition of the counter tubes 1011, 1012, etc., accurately identifies the line having elemental areas under the various pick-up coils at each instant of time.

As shown in the drawing the counter tubes 1011 and 1012 have been arranged so that they are reset to their zero or initial condition once per revolution by a negative pulse applied to them as will be described hereinafter. When these tubes are in their initial or zero condition, it is assumed that the right-hand triode is conducting current between its anode and cathode but that no current flows in the anode path of the left-hand section of these tubes.

The synchronizing or timing pulses after passing through the delay line 291 and the repeating and inverting tube 290 are applied to both sections of tube 1011 through the coupling condenser 1015 and the two diode rectifiers as shown in the drawing. The timing pulses as received from amplifier 60 through the delay line 291 are of a positive polarity. These delayed pulses are repeated by tube 290 as negative pulses and applied to the two coupling diodes. The diodes are poled in such a direction as to offer a low resistance or impedance to negative pulses. Under the assumed conditions with the right-hand section of tube 1011 conducting current, its anode will be at a lower voltage than the anode of the left-hand section. Consequently, the diode connected to this right-hand section will offer appreciably more impedance to the pulse than will the diode connected to the left-hand section. Furthermore, the application of a negative pulse through this right-hand diode to the anode of the right-hand section of tube 1011 and then through the coupling network to the control grid of the left-hand section produces no appreciable effect upon either section of this tube. However, the application of the negative pulse to the left-hand anode of tube 1011 and then through the coupling condenser to the control grid of the right-hand section of this tube tends to reduce the current flowing in the right-hand section. As a result the voltage of the anode of the right-hand section tends to rise or become more positive and applies a more positive voltage to the control grid of the left-hand section of tube 1011 which tube then starts to conduct current and as a result its anode voltage falls tending to make the grid of the right-hand section still more negative. Consequently, the current previously flowing through the right-hand section of tube 1011 is interrupted and current flow through the left-hand section initiated.

Under these circumstances tube 1011 indicates a count of one and remains in the above-described conducting conditions wherein current flows through the left-hand section but not through the right-hand section until the next timing pulse is applied to both sections of this tube.

The second delayed timing negative pulse is again applied to both anodes of tube 1011 in the same manner as above described. At this time, however, current flowing through the left-hand section is interrupted due to a negative pulse transmitted from the anode of the right-hand section of tube 1011 and the coupling network to the control grid of the left-hand section. As a result of the consequent decrease in current flowing through the left-hand section, positive voltage is applied to the control grid of the right-hand section which causes current to start to flow through this section.

Thus, upon the application of each of the delayed negative timing pulses the conducting conditions in tube 1011 are reversed.

The initiation of a discharge through the right-hand section of tube 1011 causes the voltage of the anode of this section to fall from substantially the full anode battery supply voltage to a much lower voltage which in turn applies a negative pulse through the coupling condenser and the rectifiers or diodes connected to the two anodes of tube 1012. Under the assumed conditions, prior to the application of this negative pulse, the right-hand section of tube 1012 is conducting current while the left-hand section is not. The application of the negative pulse to the two diodes does not at once effect the cut-off of the right-hand section. However, the application of the negative pulse through the diode connected to the anode of the left-hand section and then through the coupling arrangement to the control grid of the right-hand section reduces or interrupts the current flowing to the right-hand section of this tube thus causing the anode of this section to rise in voltage and apply a positive voltage to the grid of the left-hand section which then starts to conduct current and applies a still more negative voltage to the grid of the right-hand section. In this manner the application of a negative pulse through the coupling condenser and coupling diodes causes the current flowing through the right-hand section to be interrupted and a flow of current through the left-hand section initiated.

Had the left-hand section been conducting current instead of the right-hand, then the application of the negative pulse would be transmitted through the opposite diode and cause the interruption of the current flowing through the left-hand section and an initiation of current flowing through the right-hand section. In other words, upon the application of each negative pulse from the anode of the right-hand section of tube 1011, the discharge current within the tube 1012 is transferred from the previously conducting section to the other section. In a similar manner, each time the anode of the right-hand section becomes more negative due to the initiation of a flow of current to this section of tube 1012, a negative pulse is relayed to the next counter stage and so on.

With the right-hand section of tube 1011 conducting and the left-hand section of tube 1012 conducting, these two tubes indicate a count of 2, since two synchronizing pulses have been applied to tube 1011 as described above.

It should be noted that the counter tubes are advanced by delayed timing pulses. In other words, these counter tubes are not advanced until the undelayed timing pulses have controlled the gate circuits 731, 732, etc., in a manner described hereinafter. Consequently, the timing pulses control the gate circuits and accurately indicate the setting of the counter tubes in a manner described hereinafter before the counter tubes are advanced by the respective delayed timing pulses.

In a similar manner additional synchronizing pulses are counted by tubes 1011, 1012 and similar tubes not shown in the drawing but provided when necessary. Thus the setting of the conducting conditions of the counter tubes of 1011, 1012, etc., at all times accurately represents the identity of the calling line being tested or scanned at each instant of time.

Tubes 1040 and 1041 are gas-filled tubes having a gas pressure of a fraction of an atmosphere and in which the control grid loses control of the current flowing in the anode-cathode circuits once this current starts to flow. These tubes are initially set or conditioned with no current flowing in their anode-cathode circuits and are restored to this condition after each call has been recorded and noted as will be described hereinafter. With each of the tubes 1040, 1041, etc. non-conducting their anodes are at a relatively high positive potential. However, the diodes 155, 156, etc., are connected to the respective anodes of tubes 1040 and 1041 in the direction to oppose the flow of current through these diodes when these tubes are non-conducting. However, at this time the common terminal of the combining circuit which is connected to the grid of tube 911 is maintained at a relatively low voltage by the output of amplifier 146 until an X signal recorded in channel J is picked up by the corresponding pick-up coil 145.

Upon the sampling of line 14 during the next revolution of the drum 104 after the X signal is recorded in channel J of the delay section of the drum the output of the X lead of amplifier 146 will have a high positive voltage applied to its X lead due to the X signal recorded in this channel of the magnetic drum.

Under the assumed conditions the high positive voltage on the X lead 143 from amplifier 146 is the last high positive voltage to be applied to the diodes 153, 154, 155 and 156 with the result that the voltage of the common conductor of this combining circuit changes to a high positive value and tube 911 repeats a high positive voltage in its output or cathode circuit to diodes of the gate circuits 731, 732, etc. If the corresponding counter tube indicates a 1, the right-hand sections will be non-conducting and thus have their anodes at a relatively high voltage. If, on the other hand, these counter tubes indicate a count of zero the right-hand section will be conducting and its anode at a correspondingly low voltage with the result that the left-hand sections of gates 731 and 732 are substantially blocked or ineffective to transmit a positive voltage to their common or output terminal.

Thus, during the time the X signal recorded in channel J passes under the pick-up coil 145 and causes a high positive voltage to be applied to the output lead 143 from amplifier 146, positive voltage will be applied to all of the input terminals on the left-hand side of the gate circuits 731, 732, etc., when the synchronizing pulse occurring at this time is received from the pick-up coil 59 and amplifier 60. As a result, the tubes 1040, 1041, etc., which are individual to the counter tubes 1011, 1012, etc., which indicate a count or digit value of 1 have a positive voltage applied to their control grids. The tubes 1040 and 1041 individual to counter tubes 1011, 1012, etc., which are in their original or initial condition, that is, indicating a digit value of zero, do not have a positive voltage applied to their control grids. Consequently, discharges are initiated through the register tubes 1040, 1041, etc., at this time if a corresponding counter tube is in its operated condition and are not initiated if the corresponding counter tube is in its initial or zero condition. As a result, the register tubes 1040, 1041, etc., have discharges initiated through them in accordance with the count of the binary counter tubes 1011, 1012, etc. In addition, each high positive pulse from amplifier 60 causes the counter to advance by a count of one. Thus the count of the binary counter designates or identifies the calling line which is assumed to be the line designated 14 in the drawing.

Generally the count of the binary counter which identifies the respective calling lines will not be the directory number of the calling line but may be such number or represent such number when desired.

Indicating devices 1070 and 1071 are connected in the cathode circuits of tubes 1040 and 1041 and have discharges initiated through them at substantially the same time discharges are initiated in the corresponding register tubes 1040 and 1041, thus indicating to an attendant the identity of the calling line. It is to be understood of course that relays, switches or other indicators or other types of mechanisms may be employed in addition to or in place of the gas tube indicators 1070, 1071, etc., for indicating the identity of the calling line or for responding to the call from the calling line in any desired manner. These responsive devices may actuate other switching devices, signals, buzzers, lamps and the like.

In addition, the initiation of a discharge through the register tubes 1040, 1041, etc., causes the anode of the tubes through which discharge is initiated to fall to a relatively low voltage with the result that the voltage applied to the diodes 155, 156, etc., also falls to a relatively low value. Consequently, the voltage applied to the grid of tube 911 also falls to this low value so that the output of tube 911 is no longer sufficient to permit positive voltages to be transmitted through the gate circuits 731, 732, etc., and as a result the register circuits will remain in the condition indicating the identity of a calling line until restored by an attendant or by other means.

When it is desired to restore the register circuits described above to their initial or zero condition, key 1051 will be operated which applies a more negative voltage to the grid of the left-hand section of tube 1050 for a short interval of time during the charging time of the small condenser 1052. As a result of the cross couplings of the monostable circuits of tube 1050 the current flowing through this section is interrupted and current flow through the right-hand section of this tube initiated. As a result, the voltage applied to the diode 154 is reduced so that further signals or high positive pulses received over conductor 148 cannot be relayed to the grid of tube 911, even if and when the other input controls described herein would otherwise permit pulses to be repeated from conductor 143 to the grid of tube 911. In addition, the voltage of the left-hand anode of tube 1050 becomes more positive and is applied through the right-hand terminals of gates 731, 732, etc. As a result, positive voltage is applied to the grids of the restoring tubes 1060, 1061, etc., during the application of synchronizing pulses to the gate circuits 731, 732, etc.

The application of positive voltages to the control elements of tubes 1060 and 1061 causes these tubes to conduct current with the result that the voltage of their anodes and the anodes of the register tubes 1040, 1041, etc., is reduced to a low value. The voltage of the cathodes of the register tubes is maintained for a short interval of time at the voltage resulting from the discharge current flowing through the cathode resistor by the condenser connected around that resistor. The reduction of the anode voltage of these tubes 1040, 1041, etc., is sufficient to reduce the voltage between the anodes and cathodes of these tubes, below the sustaining voltage required by the register tubes to maintain a discharge through them. As a result, the discharge through these register tubes is interrupted and the register circuit restored to normal. Likewise, the indicating tubes 1070 and 1071 are also restored to normal, thus canceling the identity of the previous called line.

Thereafter, as condenser 1052 continues to charge the voltage of the grid of the left-hand section of tube 1050 approaches the voltage of the grid of the right-hand section. When these two grid voltages differ by less than the magnitude of the negative pulses as applied to the cathodes of both sections of tubes 1050 the next delayed negative synchronizing or timing pulse applied to the cathodes of this tube causes the grid-to-cathode voltage of the left-hand section to become sufficiently positive to initiate a flow of current through the left-hand section of tube 1050 which in turn, due to the cross-connections between the sections of this tube, causes the current flowing through the right-hand section to be interrupted. As a result the voltage of the anode of the left-hand section falls to a relatively low value so that no further pulses are transmitted through the right-hand terminals of the gate circuits 731, 732, etc. In addition, the voltage of the right-hand section of tube 1050 rises so that positive voltage is applied to the diode 154 thus indicating that the register circuit is again in condition for responding to other X signals recorded in channel J.

The X signals recorded in the various channels as described above may be canceled or removed by applying 0 signals to the corresponding recording amplifiers in response to the opening of key 10 of line 14, for example, with the result that after a predetermined time of positive signals or pulses on the XO lead at times assigned to line 14 for example, or after a predetermined number of said signals have been received over this lead, the timing circuit 270 functions and causes zeros to be written in all of the channels G1 and J which may have X signals stored in them in the individual areas assigned to the respective calling lines.

It is thus evident that the calling arrangement described is capable of recording a call originating on any one or more of a plurality of lines and then register and indicate this fact and the identity of the line over which the calling signals originated. That portion of the equipment required to indicate these signals may later be restored to normal whereupon it is ready to register and indicate the signals received over the next line the elemental areas of which have a complete series of signals recorded in them and which next pass under the pole tips of the pick-up coils. The identity of this line is also indicated. It is also evident that calls from all of the lines may all be substantially simultaneously recorded by the magnetic recording equipment and the associated electrostatic scanning or distributor mechanism.

When desired, the anode of the left-hand section of tube 1050 or the output of the repeating tube 911 may be connected to the right-hand side of gate circuit 231 and cause an 0 signal to be recorded in channel J in the elemental area of this channel assigned to line 14, for example, with the result that after the indication of a call has actuated the register circuit and equipment the X signal in his elemental area of channel J will be canceled and changed to an 0 signal.

Details of the recording amplifiers, recording coils, pick-up coils, pick-up amplifiers and transfer amplifiers and equipment are shown in Fig. 2. Here the two sections of the drum are illustrated as two drums wherein the delay drum or section of the drum is illustrated by drum 104 and the storage section by drum 105. The recording amplifiers, such as 110, are illustrated by tubes 311 and 312. These tubes may be separate tubes as shown in the drawing or they may be sections of a twin tube. The tube 311 is employed to write or record X signals in the elemental areas of the corresponding channel, while tube 312 is employed to write or record 0 signals. Thus, each time a positive pulse is applied to the No. 2 terminal and thus through the coupling condenser to the grid of tube 311 current flows in the output or anode-cathode circuit of this tube and through the X winding of the recording or writing coil 111, for example. Conversely, when a positive pulse is applied through the coupling condenser to the No. 3 terminal positive voltage is applied to the grid of tube 312 with the result that current flows in the output circuit of tube 312 and through the O winding of the recording coil 111, causing an 0 signal to be recorded in the elemental areas passing under this coil at this time.

The elemental areas recorded by the recording coil 111 then rotate part-way around the delay drum 105 and pass under the pick-up coil 112, for example, and induce voltages in the two output windings of this coil. These voltages have the wave forms illustrated by the small curves designated TX and TO in response to an X signal or an 0 signal passing under the pick-up coil 112. These voltages are applied through respective resistances to the grids of tubes 315 and 316. As shown in the drawings, tube 315 has a condenser connected between its anode and grid which condenser in combination with said grid circuit resistance causes the combined circuit to operate as an integrating device and in effect integrates the signal applied to the control grid of this tube. Likewise, tube 316 has a condenser 318 similarly connected and integrates the voltage wave form applied to the control element or grid of tube 316 with the result that the output wave form of the anodes of these tubes is as illustrated by the curves designated 317–X and 317–O. It is to be understood that the tubes 315 and 316 represent a suitable amplifier which may comprise one or more stages of amplification, depending upon the extent of amplification required and the accuracy of the integration necessary. The output of the integrating tubes 315 and 316 is connected to the control grids of tubes 321 and 322, respectively. These grids are also biased so that in the absence of a signal applied to them substantially no current flows in their output circuits. In addition, these grids are connected to a source of synchronizing signals received over lead 305 so that when positive synchronizing signals are applied to lead 305 and the voltage from either tube 315 or 316 is at a high positive value, current will flow in the corresponding tube 321 or 322 and cause a corresponding X or 0 signal to be recorded in its elemental area under the recording coil 114 at this time.

Thereafter, the signal or signals are carried around the drum 105 and pass under the pole tips of the pick-up coil 115. The output of coil 115 is applied to the integrating tube 331 and associated circuit and integrated as before and then repeated by tube 332. The integrated signal applied to the grid of tube 332 comprises a voltage of relatively high amplitude in response to an X signal passing under the pole tips of coil 115 so a high positive voltage is repeated by the cathode of this tube to the X output lead. Conversely, when the integrated signal applied to the input of tube 332 comprises a voltage of relatively low amplitude in response to an 0 signal passing under the pole tips of coil 115, the anode of tube 332 is at a high positive voltage in response to such 0 signals and this positive voltage is coupled through a gas or high vacuum diode 333 to the O output lead where it causes a high positive voltage to be applied to this lead. These voltages are employed in the circuits as described herein to control the various other recording and indicating circuits. The change in voltage applied to the O lead in response to an X signal passing under pole tips and the change in voltage applied to the X lead in response to an 0 signal passing under the pole tips of the pick-up coils are both of low magnitude.

After the signal recorded by the recording coil 111 as described above passes under the pick-up or reading coil 112 it will pass under the erasing coil 113 and be erased in the manner described hereinbefore whereupon the elemental area assigned to the respective lines is again in condition to respond to signals recorded by the recording coil 111.

It should be noted that the pick-up coils as shown in Fig. 1 have their pole-pieces oriented with respect to the cylinder such that the air-gap extends circumferentially around the cylinder. Consequently, the recording coils orient the magnetic vectors circumferentially around the cylinder in their respective channels. As shown in Fig. 2 the air-gap is shown extending along the axis of the drum and at right angles to the arrangement shown in Fig. 1. The coil 118 has likewise been shown rotated 90 degrees from that shown in Fig. 1. It is to be understood that the recording and pick-up coils as well as the other equipment operate with the coils in either orientation. However, in an exemplary embodiment the coils have been actually oriented as shown in Fig. 1. The air-gaps of the coils have been rotated through substantially 90 degrees in the showing of Fig. 2 to aid in the drawing and understanding of the manner in which the various coils are located one relative to another and the flow of signals or pulses from the first recording coil through the delay drum and then to the storage drum and finally to the final pick-up coil from the storage drum. It is to be understood, of course, that when desired the coils may be arranged as actually shown in Fig. 2, as satisfactory operation will be obtained when the coils are so arranged.

Although a specific embodiment of the invention has been shown in the drawing and described in detail herein, it will be understood that various modifications may be made without departing from the scope and spirit thereof as defined in the appended claims.

What is claimed is:

1. In combination, an electrostatic scanning device comprising a plurality of stationary conductors arranged in pairs, a shielding member interposed between each of said pairs of stationary conductors, a plurality of signaling circuits each comprising two conductors, means including interconnections for connecting each of said conductors of each of said circuits to the individual stationary conductors of one of said pairs of stationary conductors for conveying voltages representing the signaling conditions of said signaling circuits to said pairs of stationary conductors, a movable conductor, means for rotating said movable conductor past each of said stationary conductors in succession, and electrical means operatively interconnected with said movable conductor responsive to the combined voltage condition of the conductors of said circuits at the times said movable conductor passes said pairs of stationary conductors.

2. In combination, a plurality of signaling lines each comprising two conductors, means for applying a voltage difference between said two conductors, an electrostatic scanning device comprising a fixed segment for each conductor of each of said signaling lines arranged in pairs, means for conveying voltages representing different signaling conditions from the conductors of said lines to the individual segments of a corresponding pair of said segments, a movable conductive element, means for moving said movable conductive element past said segments in sequence for obtaining a voltage condition on said movable element under control of the voltage impressed upon said segments at the time said movable element moves past said segments and electrical means operatively interconnected with said movable element for adding together the successive voltage conditions obtained from adjacent segments of each pair of segments.

3. In combination, a plurality of signaling lines each comprising two conductors, means for applying a voltage difference between said two conductors, an electrostatic scanning device comprising a fixed segment for each conductor of each of said signaling lines arranged in pairs, electrical interconnecting means for operatively interconnecting said conductors of each of said lines with individual segments of a corresponding pair of said segments, a movable conductive element, means for moving said movable conductive element past said segments in sequence for obtaining a voltage condition on said movable conductor under control of the voltage impressed upon said segments at the time said movable element moves past said segments, summing apparatus interconnected with said movable element for adding together the voltage conditions obtained from adjacent segments of each pair of segments, and means electrically connected to said summing apparatus for restoring said summing apparatus during the time said movable element moves from the last segment of one of said pairs of segments to the first segment of a succeeding pair of segments.

4. In combination, a plurality of signaling lines each comprising a plurality of conductors, apparatus for applying a voltage condition to each of the conductors of said lines, a scanning apparatus for periodically sampling the voltage condition of each of the conductors of said lines, and storing means electrically and operatively connected to said scanning apparatus for storing an electrical quantity representing the voltage condition of one of the conductors of one of said lines, and apparatus also electrically and operatively connected to said scanning apparatus for adding to said stored quantity another electrical quantity representing the voltage condition of said other conductor.

5. In combination, a plurality of signaling lines each comprising a plurality of conductors, apparatus for applying a voltage condition to each of the conductors of said lines, a scanning device for periodically sampling the voltage condition of each of the conductors of said lines, storing means connected to said scanning device, said storing means including a condenser for storing a charge representing the condition of one of the conductors of one of said lines, voltage means connected to said scanning device for deriving a voltage representing the voltage condition of the other of said conductors and apparatus jointly responsive to said charge on said condenser and to said derived voltage, restoring apparatus connected to said storage means to restore the charge on said condenser to a reference condition, and means for operating said restoring means in synchronism with said scanning device.

6. In combination in a scanning arrangement, a plurality of signaling lines for transmitting different signaling conditions, each of said lines having at least two line conductors, a plurality of segments, means for conveying voltages representing different signaling conditions from each of said line conductors of a line to adjacent ones of said segments, means for moving a scanning conductor adjacent to each of said segments in succession, electrical means operatively interconnected with said scanning conductor for combining the output from said adjacent segments to indicate the combined electrical condition of said line conductors.

7. In combination, a plurality of signaling lines each having at least two line conductors, signal receiving apparatus comprising a scanning mechanism, a pair of electrodes included in said scanning mechanism for each of said lines, means for electrically and operatively interconnecting each of the line conductors with one of said electrodes individual to said line, apparatus for applying voltages of opposite polarities to said line conductors, a pick-up member, means for rotating said pick-up member past each of said electrodes, apparatus responsive to the voltage of said pick-up member as it moves past said electrodes and instrumentalities for combining voltages of opposite polarity interconnected with said pick-up member for indicating the combined electrical condition of said line conductors each time said pick-up member moves past adjacent electrodes interconnected with said line.

8. In combination, a plurality of signaling lines each having at least two line conductors, signal receiving apparatus comprising a scanning mechanism, a pair of segments included in said scanning mechanism individual to each of said lines, means for electrically interconnecting each of the line conductors with one of the segments individual to said line, apparatus for applying voltages of opposite polarities to said line conductors, a pick-up member, means for rotating said pick-up member past each of said segments, a condenser and a unilateral conductive device interconnected in series with said pick-up member for storing a voltage of one polarity obtained from said pick-up member as said pick-up member rotates past one of said segments, combining apparatus connected to said pick-up member for combining voltages of opposite polarity obtained from said pick-up member with said stored voltage, and amplitude responsive means connected to and controlled by said combining apparatus.

9. In combination, a plurality of signaling lines each having at least two line conductors, signal receiving apparatus comprising a scanning mechanism, a pair of electrodes included in said scanning mechanism individual to each of said lines, means for interconnecting each of the line conductors with one of the electrodes individual to said line, apparatus for applying voltages of opposite polarities to said line conductors, a pick-up member, means for rotating said pick-up member past each of said electrodes, a condenser and a unilateral conductive device interconnected in series with said pick-up member for storing a voltage of one polarity obtained from said pick-up member as said pick-up member rotates past one of said electrodes and combining apparatus connected to said pick-up member for combining voltages of opposite polarity obtained from said pick-up member with said stored voltage as said pick-up member rotates past said electrodes.

10. In combination, a plurality of signaling lines each having at least two line conductors, signal receiving apparatus comprising a scanning mechanism, a pair of segments included in said scanning mechanism individual to each of said lines, means for interconnecting each of the line conductors with one of the segments individual to said line, apparatus for applying voltages of opposite polarities to said line conductors, a pick-up member, means for rotating said pick-up member past each of said segments, a condenser and a unilateral conductive device interconnected in series with said pick-up member for storing a voltage of one polarity obtained from said pick-up member as said pick-up member rotates past one of said segments, apparatus for combining voltages of opposite polarity obtained from said pick-up member with said stored voltage, magnetic storing mechanism for storing signals, and an amplitude responsive means responsive to combined outputs which exceed a predetermined value interconnected between said storage means and said pick-up means.

11. In combination in a scanning arrangement, a plurality of signaling lines each having at least two line conductors, a scannable element individual to each of said line conductors, means including interconnections between said scannable element and its respective line conductor for applying signalling conditions to the scannable elements under control of said lines, a scanning element, means for moving said scanning element adjacent each of said scannable elements in succession for inducing voltages on said scanning element, apparatus interconnected with said scanning element for combining the voltages induced on said scanning element as it passes adjacent scannable elements individual to a given line to indicate the combined electrical condition of said line conductors.

12. In combination, a scanning arrangement in accordance with claim 11 characterized in that said apparatus interconnected with said scanning element includes apparatus for summing the magnitude of the electrical condition of said scanning element as it passes adjacent the scannable elements interconnected with one of said lines.

13. In combination, a scanning arrangement in accordance with claim 11 characterized in that said apparatus interconnected with said scanning element comprises apparatus for summing the magnitude of the electrical condition of said scanning element as it passes adjacent the scannable elements interconnected with one of said lines, an output circuit and apparatus for applying one electrical condition to said output circuit when said scanning element passes adjacent the scannable elements connected to a closed line and apparatus for applying a different electrical condition to said output circuit when said scanning element passes said scannable elements connected to an open line.

14. In combination, a scanning arrangement in accordance with claim 11 characterized in that said apparatus interconnected with said scanning conductor includes means responsive to the rate of change of the electrical condition of said scanning element, means for rendering said apparatus responsive to said rate of change of the electrical condition of said scanning conductor effective when said scanning conductor scans the scannable elements individual to one of said lines.

15. In combination, a scanning arrangement in accordance with claim 11 characterized in that said apparatus interconnected with said scanning conductor includes means responsive to the rate of change of the electrical condition of said scanning element, means for rendering said apparatus responsive to the rate of change of the electrical condition of said scanning conductor effective when said scanning conductor scans the scannable elements individual to one of said lines, an output circuit, means for applying one electrical condition to said output circuit in response to the rate of change of the electrical condition of said scanning element as said scanning element passes adjacent the scannable elements connected to one of said lines.

16. In combination, a scanning arrangement in accordance with claim 1 characterized in that the electrical means interconnected with said movable conductor includes means responsive to a rate of change of voltage of said movable conductor and apparatus for rendering said means effective as said movable conductor scans the conductors of one of said pairs of stationary conductors.

17. In combination, a scanning arrangement in accordance with claim 6 wherein said electrical means interconnected with said scanning conductor includes means for adding the magnitude of the voltage induced on said scanning conductor as said scanning conductor passes adjacent one of the segments connected to a line to the magnitude of the voltage induced in said scanning conductor as said scanning conductor passes adjacent the segment connected to the other line conductor of said line.

18. In combination, a scanning arrangement in accordance with claim 6 wherein said electrical means interconnected with said scanning conductor includes differentiating apparatus responsive to the rate of change of voltage of said scanning conductor as said scanning conductor moves between segments connected to the line conductors of a given line.

19. In combination, a scanning arrangement in accordance with claim 6 wherein said electrical means interconnected with said scanning conductor includes differentiating apparatus responsive to the rate of change of voltage of said scanning conductor as said scanning conductor moves between segments connected to the line conductors of a given line, switching apparatus for maintaining said differentiating apparatus not effective except when said scanning conductor passes between segments interconnected with the line conductors of a line.

20. In combination, an electrostatic scanning device comprising a plurality of stationary scannable conductors arranged in pairs, a shielding member interposed between each of said pairs of stationary scannable conductors, a plurality of signaling circuits each comprising at least two conductors, means for applying a voltage condition to each of the conductors of said pair of stationary scannable conductors representing the signaling condition of respective ones of the conductors of each of said signaling circuits, a movable electrical scanning pickup device, means for rotating said movable pickup device in spaced relationship past each of said stationary scannable conductors in succession and forming the condensers with said scannable conductors in succession, voltage responsive means and means for applying voltages to said voltage responsive means under control of the voltage induced on said movable scanning pickup device as it moves past each pair of said fixed conductors and means to combine the voltage condition applied to said voltage responsive device in response to said movable pickup device moving past a pair of said fixed conductors.

21. In combination, a plurality of signaling lines for conveying different signaling conditions comprising at least two conductors for each of said lines, means for applying a different voltage condition to each of the conductors under control of the signaling conditions of each of said lines, an electrostatic scanning device comprising a fixed segment for each conductor of each of said signaling lines arranged in pairs, means for applying voltage conditions to said fixed conductors under control of the signaling conditions of each conductor of the respective lines, a movable pickup element, means for moving said movable pickup element past said segments in sequence for obtaining a voltage condition by said movable element under control of the voltage impressed upon said segments at the time said movable element moves past said segments and electrical means responsive to the voltages applied to said fixed conductors as said movable pickup element moves past said respective fixed conductors for adding together the voltage conditions obtained from adjacent segments of each pair of conductors.

22. In combination, a plurality of signaling lines each comprising a plurality of conductors, apparatus for applying an electrical condition to each of the conductors of said lines, means controlled by signaling conditions received over the respective conductors of each of said lines for changing the electrical conditions of said conductors, scanning apparatus for periodically sampling the electrical condition of each of said conductors of said lines and storing means for storing an electrical quantity representing the electrical condition of the first of said lines under control of received signaling conditions, and means for adding to said stored quantity another electrical quantity representing the electrical condition of said other conductor.

23. In combination, a scanning mechanism including a plurality of signaling lines for transmitting different signaling conditions each of said lines having at least two line conductors, a plurality of scannable segments, means for applying an electrical condition to each of a plurality of said segments under control of the signaling condition of the conductors of each of said lines, a movable scanning element, means for moving said scanning element adjacent to each of said scannable segments in succession and inducing a voltage upon said scanning element, electrical means for combining the voltage induced in said scanning element each time said scanning element moves past each pair of said segments, and means to indicate the combined electrical condition of said line conductors.

24. In combination, in a scanning system, a plurality of signaling lines each having at least two line conductors for conveying a plurality of signaling conditions, a scannable element individual to each of said line conductors, means for applying different voltages to said scannable element under control of different signaling conditions of the respective ones of said signaling lines, a scanning element, means for moving said scanning element adjacent each said scannable elements in succession for inducing voltages on said scanning element, and combining means for combining the voltages induced on said scanning element to indicate the combined electrical condition of said line conductors.

25. A scanning arrangement comprising a plurality of signaling lines each of which has at least two line conductors, a plurality of variably electrifiable elements arranged segmentwise, connecting means whereby each conductor of each of said lines supplies a condition of electrification to said elements characteristic of its instantaneously existing state of electrification, a scanning condutor, means for driving said scanning conductor adjacent to and past each of said elements in succession, condition-of-electrification-detecting means electrically operated by said scanning conductor whereby the condition of electrification of the said elements connected to the conductors of each line are combined to produce detectable indication conjoint for the conductors of first one line, and then the next, and so on, and means for detecting such indications separately.

References Cited in the file of this patent

UNITED STATES PATENTS

| Number | Name | Date |
|---|---|---|
| 2,257,894 | Winsor | Oct. 7, 1941 |
| 2,400,112 | Greibach | May 14, 1946 |